(No Model.)

J. G. FOX.
COMBINED THREAD CUTTER AND HOLDER.

No. 367,035. Patented July 26, 1887.

ATTEST:
M. R. Thomas
W. H. Power.

INVENTOR:
Jacob G. Fox.
By
Jas. E. Thomas
Atty.

UNITED STATES PATENT OFFICE.

JACOB G. FOX, OF BAY CITY, MICHIGAN, ASSIGNOR TO LEVERETT A. PRATT, OF SAME PLACE.

COMBINED THREAD CUTTER AND HOLDER.

SPECIFICATION forming part of Letters Patent No. 367,035, dated July 26, 1887.

Application filed January 24, 1887. Serial No. 225,261. (No model.)

*To all whom it may concern:*

Be it known that I, JACOB G. FOX, a citizen of the United States, residing at Bay City, in the county of Bay and State of Michigan, have invented certain new and useful Improvements in a Combined Thread Cutter and Holder; and do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improved device for cutting off a portion of thread drawn from a spool and for retaining the free end thereof in a manner to prevent a further unwinding of the thread from the spool; and the invention consists, chiefly, in an arm which may be attached to the end of the spool, having its end projecting just beyond the periphery of the spool, and provided with cutting and holding devices, and in a means of attaching and securing the arm to the spool in a manner that it may be easily removed from one spool and secured to another; and the objects of my invention are to provide a cheaper and more convenient device, which may be quickly and easily attached to or removed from a spool, and by means of which a portion of the thread drawn from the spool may be neatly cut and the free end of the thread remaining upon the spool be retained to prevent a further unwinding of the same, and in a manner that it may be easily caught and loosened for a further unwinding when desired. The devices by means of which I attain these objects are illustrated in the accompanying drawings, in which—

Figure 2:
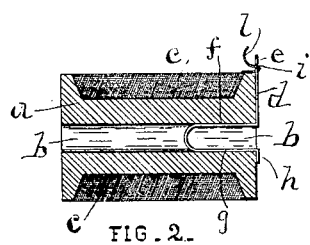
Figure 3:
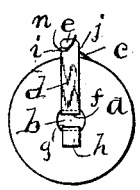
Figure 1:
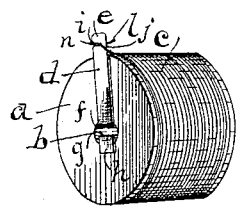
Figure 4:
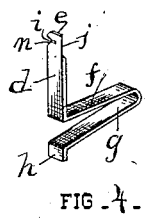
Figure 6:
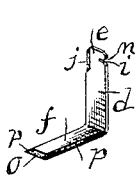
Figure 7:
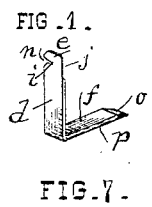
Figure 5:
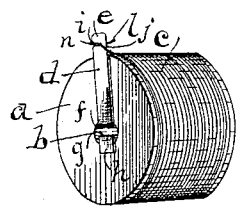
Figure 8:
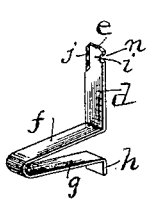

Figure 1 is a perspective view of a spool of thread with a modified form of my improved thread cutting and holding device attached thereto. Fig. 2 is a longitudinal section of the same. Fig. 3 is an end view of the same. Fig. 4 is a perspective view from the outer end of the cutter and holder. Fig. 5 is a view of the same from the inner end. Figs. 6 and 7 show the improved cutter and holder in a preferred form. Fig. 8 is an end view of the same attached to a spool.

$a$ represents a spool having the usual central opening, $b$.

$c$ is the thread upon the spool.

$d$ is an arm resting upon the side of the end of the spool $a$, and with its outer end, $e$, projecting for a short distance beyond the outer edge or periphery of the spool. The inner end of the arm $d$ is provided with a portion, $f$, turned at right angles with the arm, and is provided with its side edges beveled from the outer side thereof and forming the cutting-edges $p$, and with its end edge beveled in the same manner and forming the cutting-edge $o$. The arm $f$ is passed into the opening $d$ by placing the edge $o$ so that the outer portions of the edge $o$ will cut into the walls of the opening, while the central portion of the edge will be just clear of the wall of the opening behind the portion $f$, and when the portion $f$ is passed entirely within the opening the edges $p$ will be embedded within the walls of the opening, $d$ and the arm $d$ will rest upon and will be firmly secured to the end of the spool. This mode of securing the arm $d$ in position allows the spool spindle of a sewing-machine to pass entirely through the spool without obstruction, as the portion $f$ only occupies a small portion of the opening.

The projecting end $e$ of the arm is provided with a slit, $i$, extending inward from one edge of the arm, and upon the opposite edge is formed a cutting-edge, $j$.

The operation of the device is, that when the arm $d$ is secured to the spool by passing into the central opening, $b$, the part $f$, the sharpened edges $o$ and $p$ of which catch into the sides of the opening, the spool may be grasped by the thumb and finger in the ordinary way, and the other hand drawing the free end of the thread revolves the spool until the thread is unwound to the length desired. The spool is then turned to catch the thread within the slit $i$, as in Fig. 3, and on further turning of the spool the thread is cut by the edge $j$, leaving the end $l$ of the thread secured by the slit and extending beyond the arm to a proper distance, to allow the end $l$ to be easily grasped for again withdrawing the thread from the slit and again unwinding a portion thereof, the slit holding the end securely until the end is withdrawn.

If desired, the thread may be caught upon the arm from the opposite direction, as in Fig. 1, the thread then being first passed outside of the arm, and then caught in the slit $i$, and is then passed around the inner side of the arm and across the cutting-edge $j$, which divides the thread and leaves the end $l$ projecting from the inner side of the arm. The outer corner formed by the slit $i$ is slightly cut away to form a notch, $n$, in order to more easily catch the thread within the slit, and the slit should be arranged to be slightly wider at its outer portion, in order to catch and hold thread of different sizes. This device may be cheaply constructed by bending a strip of metal into the proper form and forming the slit and cutting-edge thereon, and a neat and handy means of cutting and holding the free end of the thread is produced, which may easily be withdrawn from one spool and attached to another, and which does not prevent the spool from being used on a sewing-machine or in any ordinary manner.

What I claim as my invention, and desire to secure by Letters Patent, is—

1. The combination, in a thread cutter and holder, of the spool with a portion, $f$, formed of a thin and narrow strip of metal passed within the central opening of the spool, and having sharpened end and side edges engaging with the walls of the opening, and having an arm extending from its outer end at a right angle and projecting beyond the periphery of the spool, and provided on one side edge of its outer end with a transverse slit extending partly across, and with a cutting-edge on the opposite side edge of the arm, substantially as and for the purpose set forth.

2. As a new article of manufacture, a thread cutter and holder consisting of a thin and narrow strip of metal provided on one side edge of one end with a transverse slit extending partly across, and with a cutting-edge on the opposite side edge, and having a portion, $f$, of its opposite end bent at right angles and provided with the side cutting-edges, $p$, and end edge, $o$, substantially as and for the purpose set forth.

In testimony whereof I affix my signature in presence of two witnesses.

JACOB G. FOX.

Witnesses:
J. E. THOMAS,
L. A. PRATT.